US011109543B2

(12) United States Patent
Lu

(10) Patent No.: US 11,109,543 B2
(45) Date of Patent: Sep. 7, 2021

(54) SOIL IRRIGATION AND RESTORATION METHOD AND SYSTEM OF THE SAME

(71) Applicants: Shun-Tsung Lu, Taichung (TW); Ta-Wei Lu, Taichung (TW)

(72) Inventor: Shun-Tsung Lu, Taichung (TW)

(73) Assignees: Shun-Tsung Lu, Taichung (TW); Ta-Wei Lu, Taichung (TW)

( * ) Notice: Subject to any disclaimer, the term of this patent is extended or adjusted under 35 U.S.C. 154(b) by 55 days.

(21) Appl. No.: 16/704,223

(22) Filed: Dec. 5, 2019

(65) Prior Publication Data

US 2021/0169022 A1 Jun. 10, 2021

(51) Int. Cl.
*B05B 1/20* (2006.01)
*A01G 25/06* (2006.01)
*A01G 25/00* (2006.01)

(52) U.S. Cl.
CPC .............. *A01G 25/06* (2013.01); *B05B 1/205* (2013.01); *A01G 2025/003* (2013.01)

(58) Field of Classification Search
CPC ... A01G 25/06; A01G 2025/003; B05B 1/205
USPC ........... 417/360, 452, 423.3, 423.15, 423.14, 417/424.1; 137/565; 111/118; 239/724, 239/725, 726
See application file for complete search history.

(56) References Cited

U.S. PATENT DOCUMENTS

| 779,052 | A | * | 1/1905 | Pope | .................... | A01G 25/097 239/724 |
| 2,802,425 | A | * | 8/1957 | Malkoff | .................. | F25B 39/04 417/424.1 |
| 2,803,091 | A | * | 8/1957 | Radford | ............... | A01G 27/005 47/80 |
| 3,799,690 | A | * | 3/1974 | Klaas | ....................... | F04D 3/005 415/72 |
| 4,231,873 | A | * | 11/1980 | Swigger | .................... | E02B 1/00 210/170.05 |
| 4,329,940 | A | * | 5/1982 | Humphries | .............. | A01K 7/02 119/72 |
| 4,428,842 | A | * | 1/1984 | House | ................. | B01D 17/0208 210/747.9 |
| 4,527,927 | A | * | 7/1985 | Bucherre | ................ | E03B 11/00 405/36 |
| 4,970,973 | A | * | 11/1990 | Lyle | ....................... | A01G 25/09 111/127 |
| 4,995,790 | A | * | 2/1991 | Schill | .................... | F04D 29/606 417/360 |

(Continued)

*Primary Examiner* — Edwin J Toledo-Duran
(74) *Attorney, Agent, or Firm* — Rabin & Berdo, P.C.

(57) ABSTRACT

A soil irrigation and restoration system comprises a water transmitting device having a water containing tank, a water pumping element, and a pipe. The water containing tank has a containing space formed therein. The water pumping element is disposed in the containing space and has at least one water inlet, a water outlet, and an overflow portion. The water outlet is spaced apart from the at least one water inlet. The overflow portion is disposed between the at least one water inlet and the water outlet, and is disposed at a position higher than that of the at least one water inlet and the water outlet. The pipe has a connecting end connected to the water outlet. A portion of the pipe away from the connecting end extends downwardly and is buried in the soil layer. A soil irrigation and restoration method executed with syphon effect is also provided.

13 Claims, 8 Drawing Sheets

(56) References Cited

U.S. PATENT DOCUMENTS

| | | | | |
|---|---|---|---|---|
| 5,076,762 | A * | 12/1991 | Lykes | F04D 29/628 |
| | | | | 417/40 |
| 5,228,842 | A * | 7/1993 | Guebeli | B05B 9/0413 |
| | | | | 417/360 |
| 5,265,810 | A * | 11/1993 | Chapman | A01G 25/097 |
| | | | | 239/724 |
| 5,529,462 | A * | 6/1996 | Hawes | F04D 29/406 |
| | | | | 417/360 |
| 5,788,466 | A * | 8/1998 | Thompson | F04D 29/605 |
| | | | | 239/724 |
| D555,858 | S * | 11/2007 | Yoo | D32/1 |
| D556,409 | S * | 11/2007 | Yoo | D32/1 |
| 10,578,112 | B2 * | 3/2020 | Aughton | G01M 3/28 |
| 2003/0059926 | A1 * | 3/2003 | deTorres | B09C 1/10 |
| | | | | 435/262.5 |
| 2006/0255172 | A1 * | 11/2006 | Dotan | A01G 27/005 |
| | | | | 239/69 |
| 2010/0122741 | A1 * | 5/2010 | Williamson | C02F 1/008 |
| | | | | 137/395 |
| 2011/0083761 | A1 * | 4/2011 | Evans | A01G 27/005 |
| | | | | 137/565.01 |
| 2014/0298719 | A1 * | 10/2014 | Mackin | A01G 27/001 |
| | | | | 47/48.5 |
| 2015/0167267 | A1 * | 6/2015 | Hyde | E03B 3/40 |
| | | | | 405/45 |
| 2019/0040972 | A1 * | 2/2019 | Schrader | B05B 1/3053 |

\* cited by examiner

SOIL IRRIGATION AND RESTORATION METHOD AND SYSTEM OF THE SAME

BACKGROUND OF THE INVENTION

1. Field of the Invention

The present invention relates to a soil irrigation and restoration method and a system of the same, and more particularly to a soil irrigation and restoration method and a system of the same executed with a syphon effect to irrigate soil layer under a surface of the soil layer.

2. Description of Related Art

Generally, crops cannot grow on dry and salinized land. For instance, since water evaporates quickly in dry areas, huge parts of water poured on land in dry areas evaporate before it can infiltrate deeply into the land. Therefore, it is hard to irrigate the land in dry areas, not to mention cultivating crops. On the other hand, when ground water level in dry area rises, salt in the ground water rises to a surface of the land in dry areas with capillary phenomenon, which causes soil salinization. Soil salinization drastically influences crop productivity. In other words, dry and salinized land can hardly be utilized in agriculture.

To overcome the aforementioned problems, a conventional underground irrigation method is utilized. The conventional underground irrigation method uses a water supplying pipe and a pressurization apparatus. The water supplying pipe is buried underground, and the water supplying pipe is connected to the pressurization apparatus, for example, a hydraulic press. To irrigate the land, turn on the hydraulic press, and then water flows underground via the water supplying pipe. In this way, roots of plants can absorb water directly. However, the hydraulic press is expensive and consumes much energy, which costs too much for farmers to adopt. In addition, if a negative pressure is formed between the water supplying pipe and the underground soil in operation of the hydraulic press, sand in the underground soil will be sucked into the water supplying pipe. Then, the water supplying pipe will be stuck by the sand in the underground soil. Besides, it is hard to maintain and repair the water supplying pipe.

To overcome the shortcomings of the conventional underground irrigation method, the present invention tends to provide a soil irrigation and restoration method and system of the same to mitigate or obviate the aforementioned problems.

SUMMARY OF THE INVENTION

The main objective of the present invention is to provide a soil irrigation and restoration method and system of the same.

The soil irrigation and restoration method comprises steps as follows: a pipe laying step, a water pumping element setting step, and a water pumping step. In the pipe laying step, lay a pipe in a soil layer, and the pipe irrigates the soil layer with water flowing therein. In the water pumping element setting step, set a water pumping element at a position higher than a surface of the soil layer. In the water pumping step, the water pumping element pumps water with syphon effect, such that water is pumped from the water pumping element downwardly to the soil layer via the pipe.

The soil irrigation and restoration system utilized on a soil layer having a surface comprises a water transmitting device disposed at a position higher than the surface of the soil layer, and has a water containing tank, a water pumping element, and a pipe. The water containing tank has a containing space formed therein. The water pumping element is located in and disposed at a lower portion of the containing space of the water containing tank, is tubular in shape, and has at least one inlet tube, an outlet tube, an overflow portion, a relief valve, and a drain valve. The at least one inlet tube extends upwardly and has a water inlet formed in a bottom of the at least one inlet tube and being adjacent to and spaced from a bottom of the containing space of the water containing tank. The outlet tube extends upwardly, is spaced apart from the at least one inlet tube, and has a water outlet formed in a bottom of the outlet tube. The overflow portion is formed on a top of the water pumping element, is connected to and communicates with a top of the at least one inlet tube and the outlet tube, and is disposed at a position higher than a position of the water inlet of the at least one inlet tube and a position of the water outlet of the outlet tube. The relief valve is disposed at the top of the water pumping element. The drain valve is disposed in the water outlet of the outlet tube. The pipe has a connecting end, and is connected to the water outlet of the outlet tube of the water pumping element via the connecting end. A height difference is formed between the connecting end of the pipe and the surface of the soil layer. A portion of the pipe away from the connecting end extends downwardly and is buried in the soil layer.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
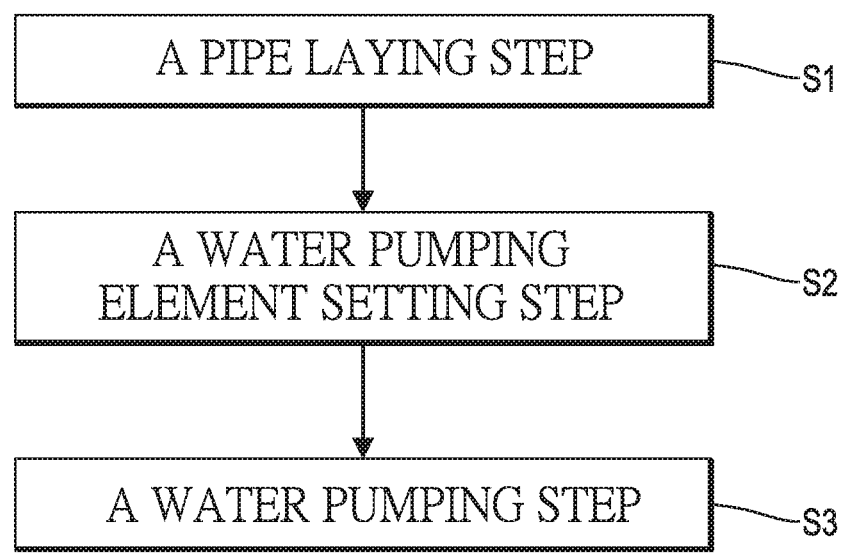
FIG. 1 is a flow diagram of a soil irrigation and restoration method in accordance with the present invention.
Figures 2, 2A:
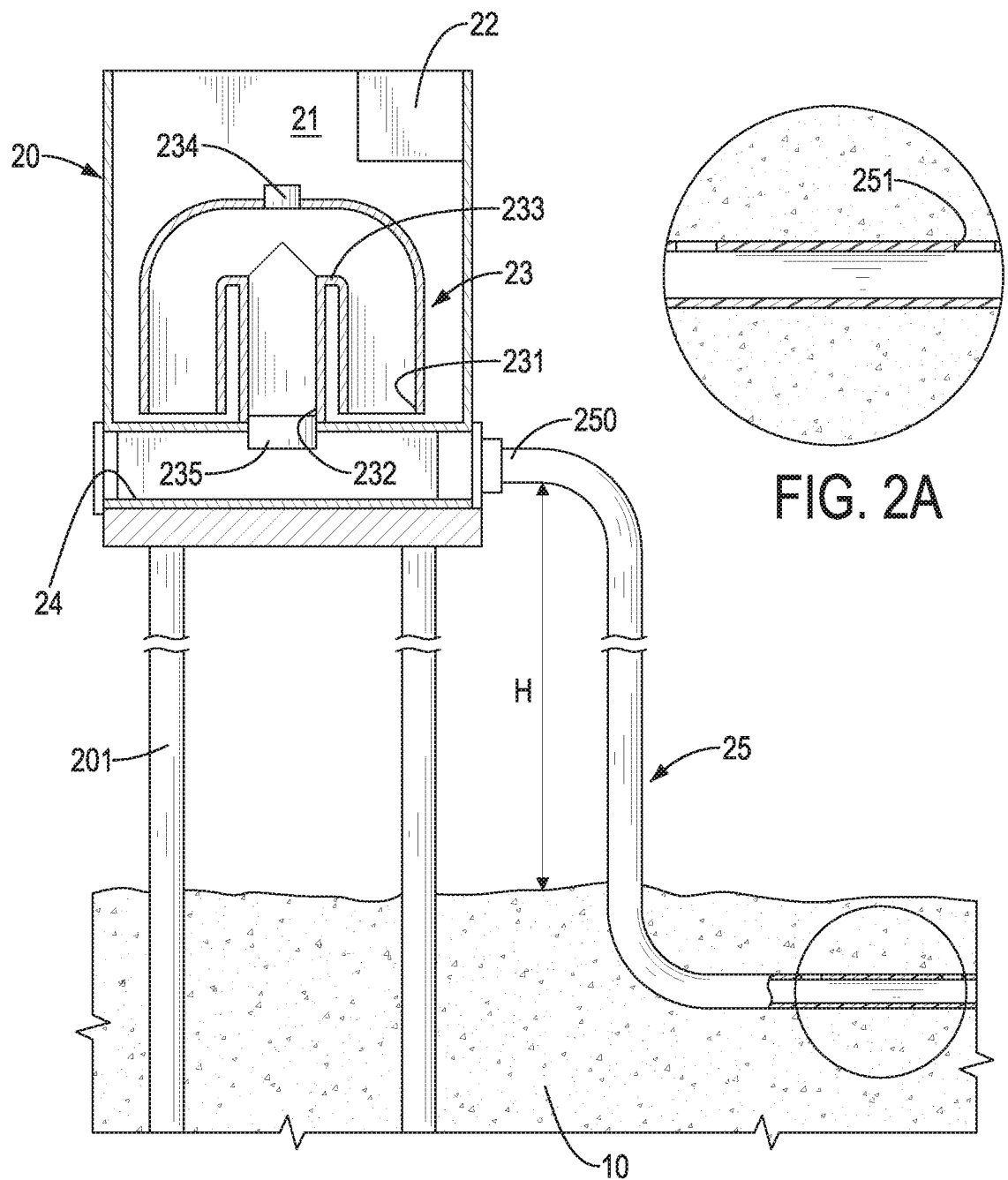
FIG. 2 is a side view in partial section of a first embodiment of a soil irrigation and restoration system in accordance with the present invention.
FIG. 2A is an enlarged cross-sectional side view of a pipe of the soil irrigation and restoration system in FIG. 2.

With reference to FIGS. 1 and 2, a soil irrigation and restoration method in accordance with the present invention includes the following steps:

S1. A pipe laying step: lay a pipe 25 in a soil layer 10. The soil layer 10 may be composed of soil on the earth surface or composed of soil contained in a basin 30. The pipe 25 laid in the soil layer 10 irrigates the soil layer 10 with water flowing therein. Moreover, the pipe 25 has at least one injection hole 251, and the at least one injection hole 251 is formed through the pipe 25. The water flowing in the pipe 25 flows through the at least one injection hole 251 to irrigate the soil layer 10.

S2. A water pumping element setting step: set a water pumping element 23 at a position higher than a surface of the soil layer 10, namely the surface of the soil layer 10 composed of the soil on the earth surface or the surface of the soil layer 10 composed of the soil contained in the basin 30.

S3. A water pumping step: the water pumping element 23 pumps water with syphon effect, such that the water is pumped from the water pumping element 23 downwardly to the soil layer 10 via the pipe 25. Since the pipe 25 is laid in the soil layer 10, the water flowing out of the pipe 25 permeates the soil layer 10 and gradually reaches the surface of the soil layer 10.

Figure 3:
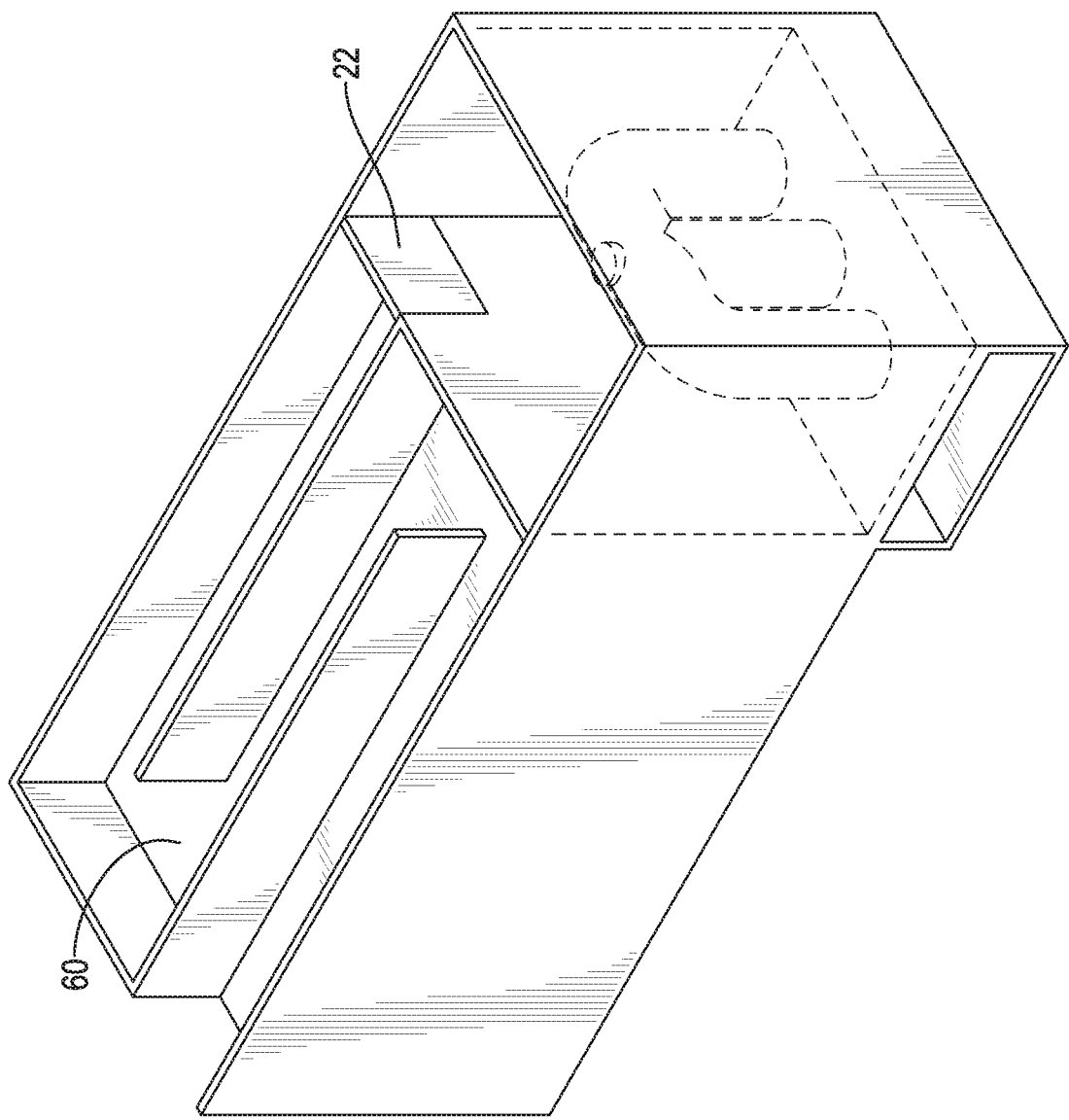
FIG. 3 is an enlarged perspective view of a water transmitting device of the soil irrigation and restoration system in FIG. 2, connected to a ditch.

With reference to FIGS. 2 and 3, a first embodiment of a soil irrigation and restoration system in accordance with the present invention includes a water transmitting device 20. The soil irrigation and restoration system is utilized on a soil layer 10, and the soil layer 10 has a surface. In the first embodiment, the soil layer 10 may be composed of soil on the earth surface such as soil on a farmland or soil on an idle vacant lot. The water transmitting device 20 is disposed at a position higher than the surface of the soil layer 10. In the first embodiment, the water transmitting device 20 has multiple supporting rods 201. Each one of the multiple supporting rods 201 has a top end and a bottom end. The top end of the supporting rod 201 is mounted to a bottom surface of the transmitting device 20, and the bottom end of the supporting rod 201 extends into the soil layer 10. The water transmitting device 20 is disposed vertically at the position higher than the surface of the soil layer 10 via the multiple supporting rods 201. In addition, the water transmitting device 20 may be disposed on objects other than the multiple supporting rods 201 on the earth surface or be disposed at a position that is higher than the soil layer 10 in terrain.

With reference to FIGS. 2 and 3, the water transmitting device 20 has a water containing tank 21, a sluice gate 22, a water pumping element 23, a water storage tank 24, and a pipe 25. The water containing tank 21 has a containing space formed therein, and the water containing tank 21 communicates with a ditch 60 comprising cold water or warm water. The sluice gate 22 is disposed on the water transmitting device 20 and communicates with the containing space of the water containing tank 21. The sluice gate 22 is disposed between the water containing tank 21 and the ditch 60 so as to communicate with the water containing tank 21 and the ditch 60, such that water flowing in the ditch 60 is guided to the water containing tank 21 via the sluice gate 22. The water pumping element 23 is located in and disposed at a lower portion of the containing space of the water containing tank 21.

The water pumping element 23 is tubular in shape and has at least one inlet tube, an outlet tube, an overflow portion 233, a relief valve 234, and a drain valve 235. The at least one inlet tube extends upwardly and has a water inlet 231 formed in a bottom of the at least one inlet tube and being adjacent to and spaced from a bottom of the containing space of the water containing tank 21. The outlet tube extends upwardly, is spaced apart from the at least one inlet tube, and has the water outlet 232 formed in a bottom of the outlet tube. In the first embodiment, the water outlet 232 is formed through a bottom of the water containing tank 21. The overflow portion 233 is formed on a top of the water pumping element 23, and is disposed between the at least one inlet tube and the outlet tube, and is connected to and communicates with a top of the at least one inlet tube and a top of the outlet tube. The overflow portion 233 is disposed at a position higher than a position of the water inlet 231 of the at least one inlet tube and a position of the water outlet 232 of the outlet tube, which makes the water pumping element 23 an inverted U-shaped structure. The relief valve 234 is disposed at a top of the water pumping element 23, and the relief valve 234 can be switched to an open or a closed status. The drain valve 235 is disposed in the water outlet 232, and the drain valve 235 can be switched to an open or a closed status.

The water storage tank 24 is mounted to the bottom of the water containing tank 21, and the water storage tank 24 communicates with the water outlet 232 of the outlet tube of the water pumping element 23. The pipe 25 has a connecting end 250, is connected to the water storage tank 24 via the connecting end 250, and communicates with the water outlet 232 of the outlet tube of the water pumping element 23 via the water storage tank 24. A height difference H is formed between the connecting end 250 of the pipe 25 and the surface of the soil layer 10. A portion of the pipe 25 away from the connecting end 250 extends downwardly and is buried in the soil layer 10. In addition, the connecting end 250 of the pipe 25 may be connected to the water outlet 232 of the outlet tube of the water pumping element 23 directly. The portion of the pipe 25 buried in the soil layer 10 has at least one injection hole 251, and the at least one injection hole 251 is formed through the pipe 25.

In use, open the relief valve 234 and close the drain valve 235. When water gradually fills the water containing tank 21, the water simultaneously flows into the water pumping element 23 upwardly via the water inlet 231 of the at least one inlet tube. According to Law of Communicating Vessels, a level of water in the water pumping element 23 is same as a level of water contained in the water containing tank 21. At the same time, air in the water pumping element 23 is gradually released via the relief valve 234 until the water pumping element 23 is submerged. After the air in the water pumping element 23 is completely released, close the relief valve 234. The water pumping element 23 at this time is filled with the water without the air. Next, open the drain valve 235, and then the water in the water pumping element 23 flows into the water storage tank 24 and the pipe 25 sequentially. The water flowing in the pipe 25 then flows into the soil layer 10 via the at least one injection hole 251 to irrigate the soil layer 10.

When the water gradually flows out of the pipe 25 via the at least one injection hole 251, the level of the water in the water containing tank 21 gradually descends to a level lower than the position of the overflow portion 233. Since the water pumping element 23 contains no air and there is a pressure difference between the water inlet 231 of the at least one inlet tube and the water outlet 232 of the outlet tube, the water in the water containing tank 21 bearing the atmospheric pressure keeps flowing in the water pumping element 23 via the inlet 231 of the inlet tube along with the water flowing out of the water pumping element 23 until the level of the water in the water containing tank 21 descends to a level lower than the position of the water inlet 231 of the at least one inlet tube according to syphon effect. In this way, the water in the water containing tank 21 is effectively utilized rather than evaporating from the water containing tank 21.

On the other hand, the height difference H between the connecting end 250 of the pipe 25 and the surface of the soil layer 10 provides the at least one injection hole 251 of the pipe 25 with a stable water pressure, which prevents a negative pressure formed between the pipe 25 and the soil layer 10. Thus this prevents sand and soil in the soil layer 10 from being sucked into the pipe 25 via the at least one injection hole 251 and sticking the pipe 25.

Moreover, in some regions where the evaporation rate is high, the soil irrigation and restoration system provides better irrigation effect than a conventional method of pouring water on the surface of the soil layer 10 directly does with same water volume. The soil irrigation and restoration system works in a way that the water flows into the soil layer 10, permeates the soil layer 10, and gradually reaches the surface of the soil layer 10, and the water thereby infiltrates the soil layer 10 effectively to improve drought. In addition to that, salt is flushed or leached out of the soil layer 10 and is dissolved by the water as the water permeates the soil layer 10 and gradually reaches the surface of the soil layer 10. Therefore, soil salinity can be effectively improved.

Figure 4:
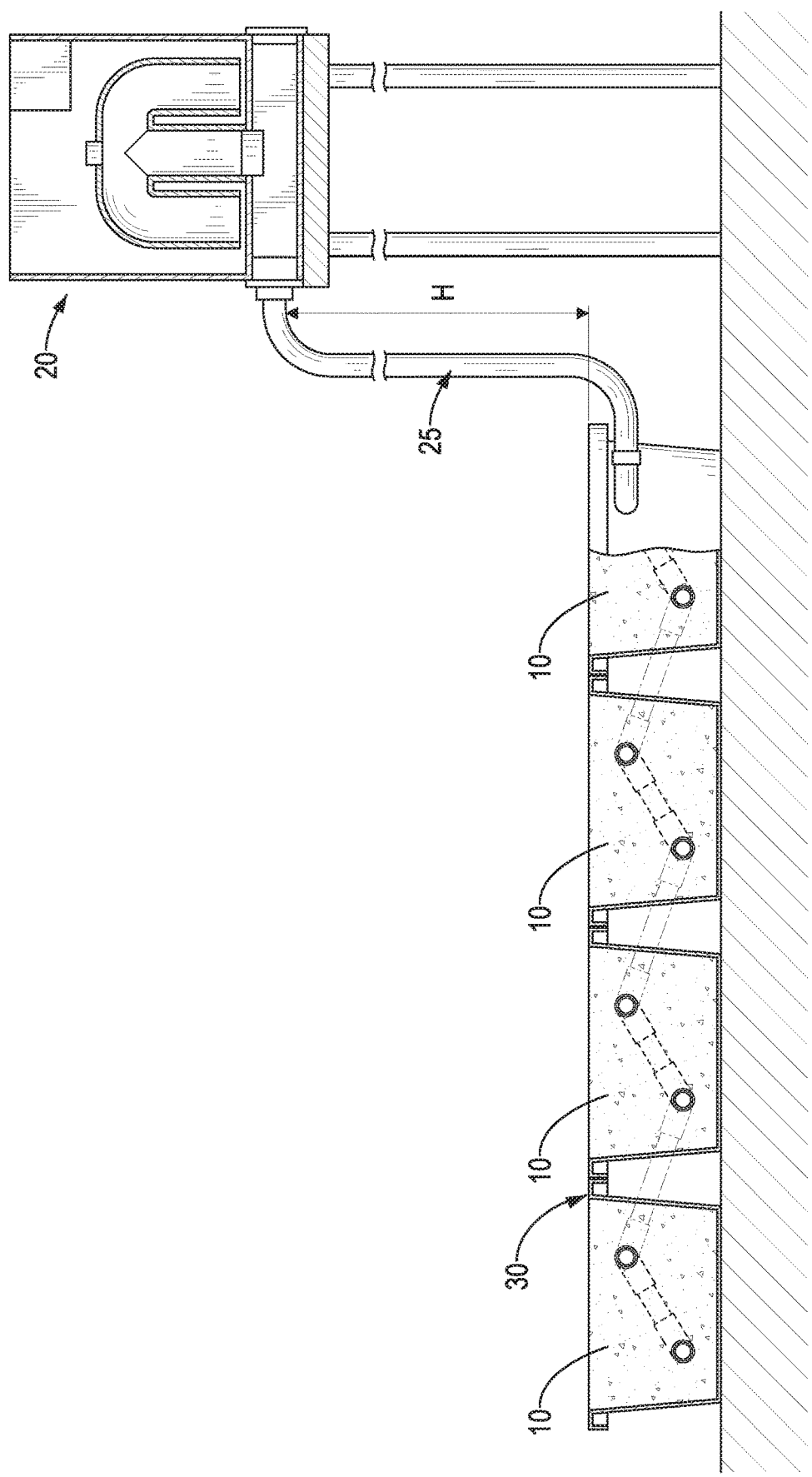
FIG. 4 is a side view in partial section of a second embodiment of the soil irrigation and restoration system in accordance with the present invention.
Figure 5:
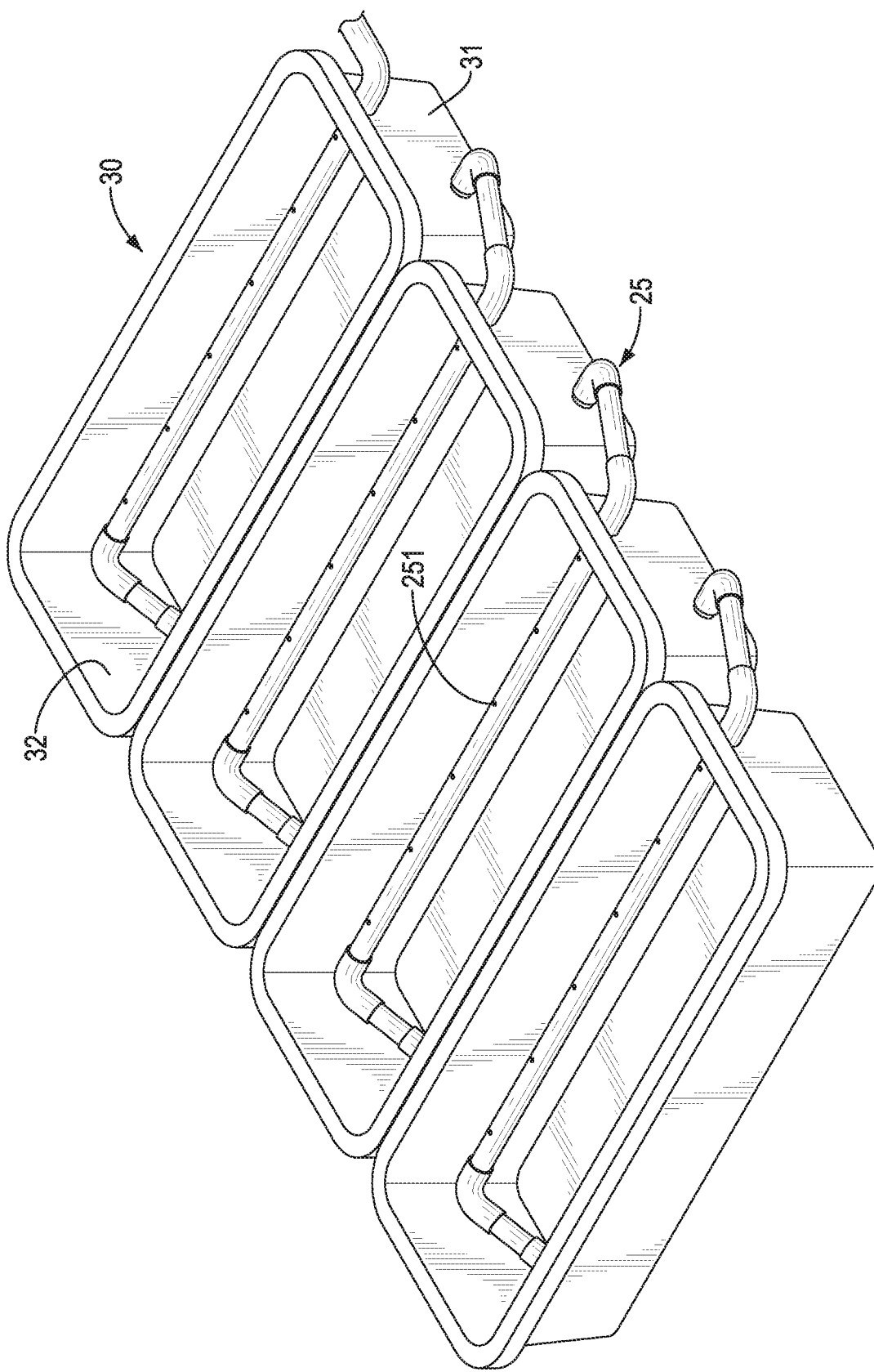
FIG. 5 is an enlarged perspective view of multiple basins connected to a pipe of the soil irrigation and restoration system in FIG. 4.
Figure 6:
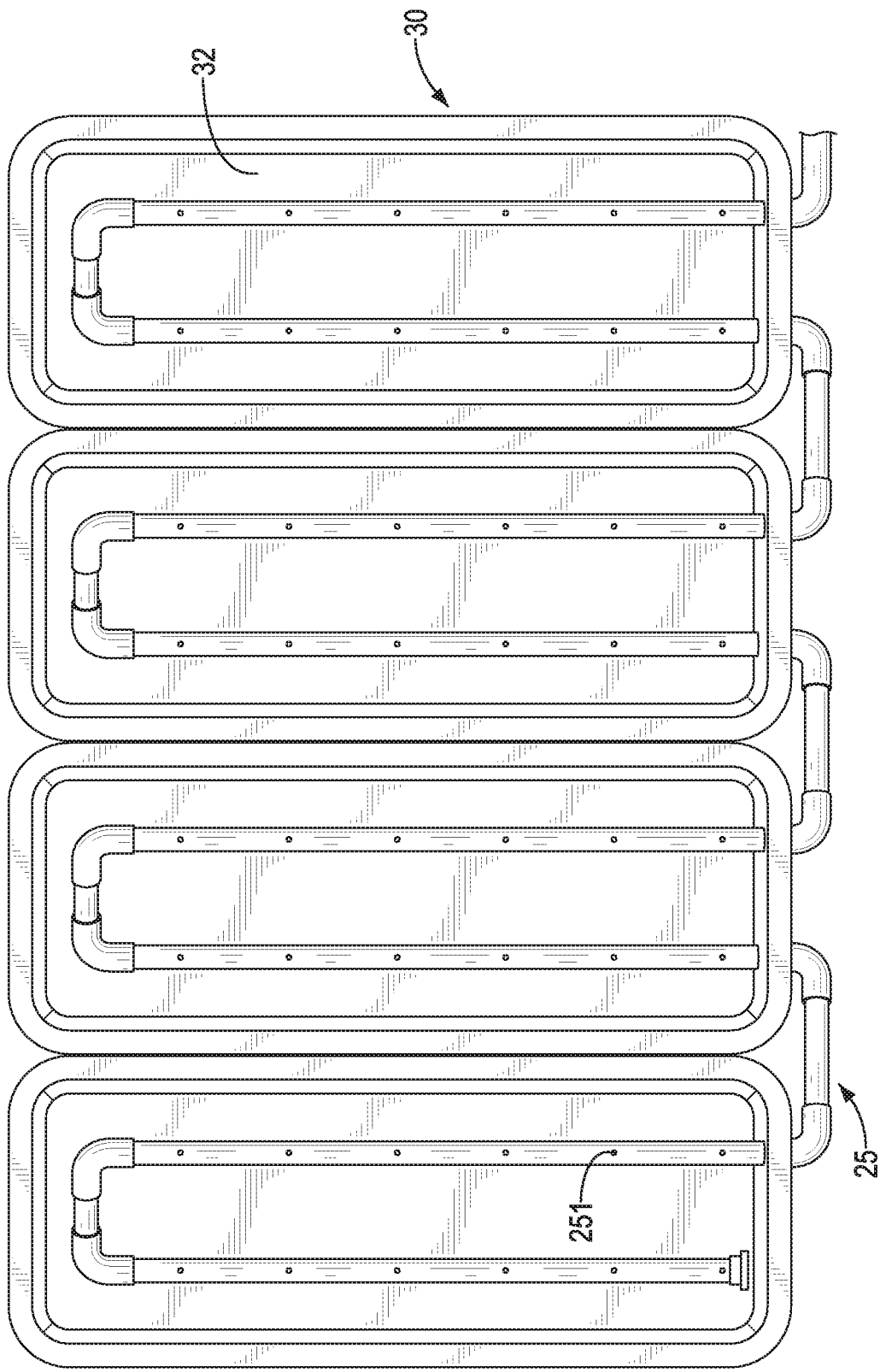
FIG. 6 is a top side view of the basins connected to the pipe of the soil irrigation and restoration system in FIG. 5.

With reference to FIGS. 4 to 6, a second embodiment of a soil irrigation and restoration system in accordance with the present invention is substantially the same as the first embodiment, and the difference between the second embodiment and the first embodiment is that: the second embodiment of the soil irrigation and restoration system includes multiple basins 30, and the multiple basins 30 are disposed at spaced intervals. The soil layer 10 is composed of soil contained in each one of the multiple basins 30. Each one of the multiple basins 30 has at least one side wall 31 and a receiving space 32, and the receiving space 32 is formed in the basin 30. The pipe 25 of the water transmitting device 20 connects the multiple basins 30. The pipe 25 extends through the at least one side wall 31 of each one of the multiple basins 30, extends in the receiving space 32 of each one of the multiple basins 30, extends into the soil layer 10 in each one of the multiple basins 30, and bends in the receiving space 32 of each one of the multiple basins 30. Sections of the pipe 25 extending in the multiple basins 30 have multiple said injection holes 251. The injection holes 251 are formed through the pipe 25 at positions where the pipe 25 extends in the multiple basins 30.

Figure 7:
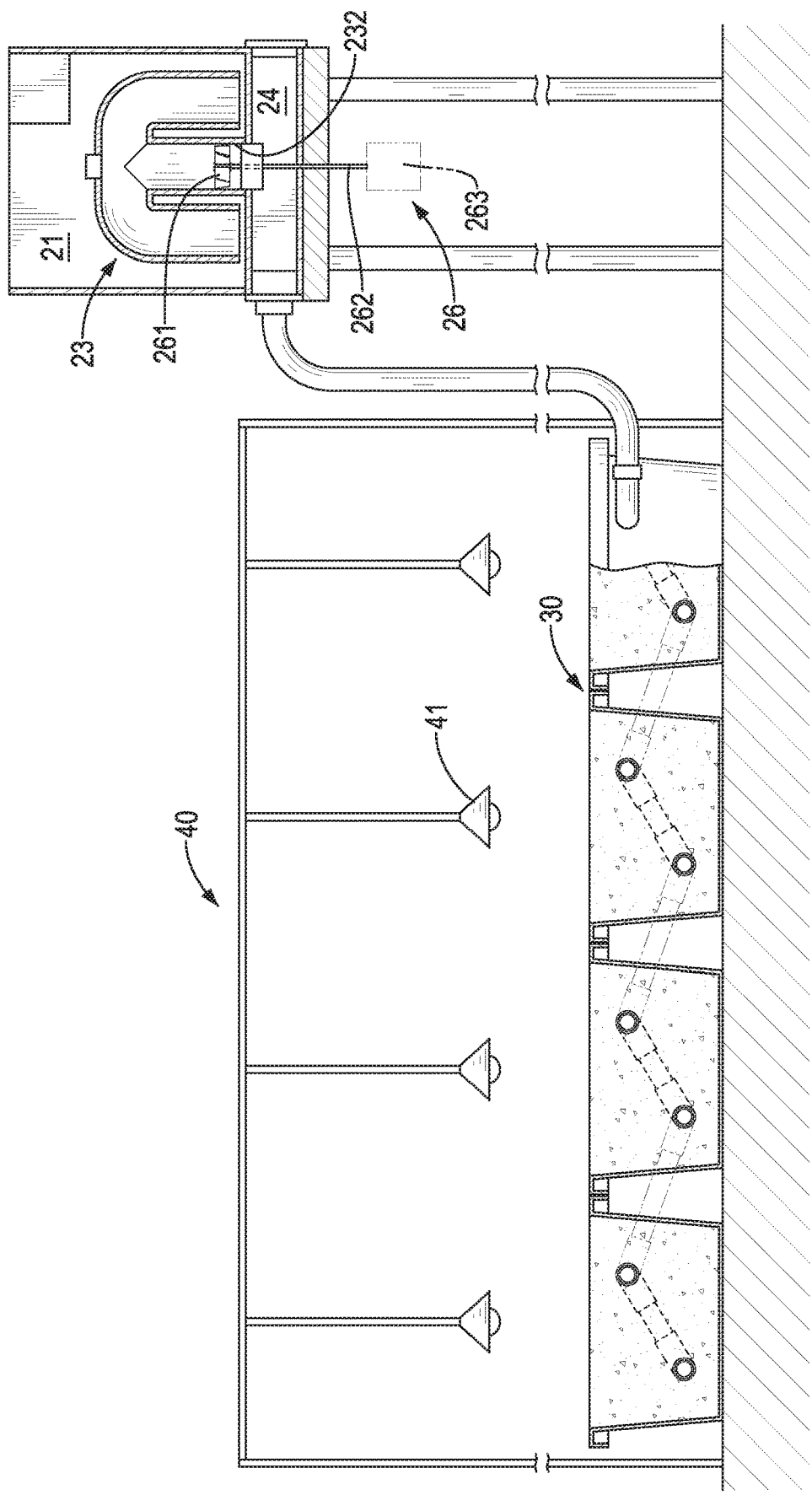
FIG. 7 is a side view in partial section of a third embodiment of the soil irrigation and restoration system in accordance with the present invention.
Figure 8:
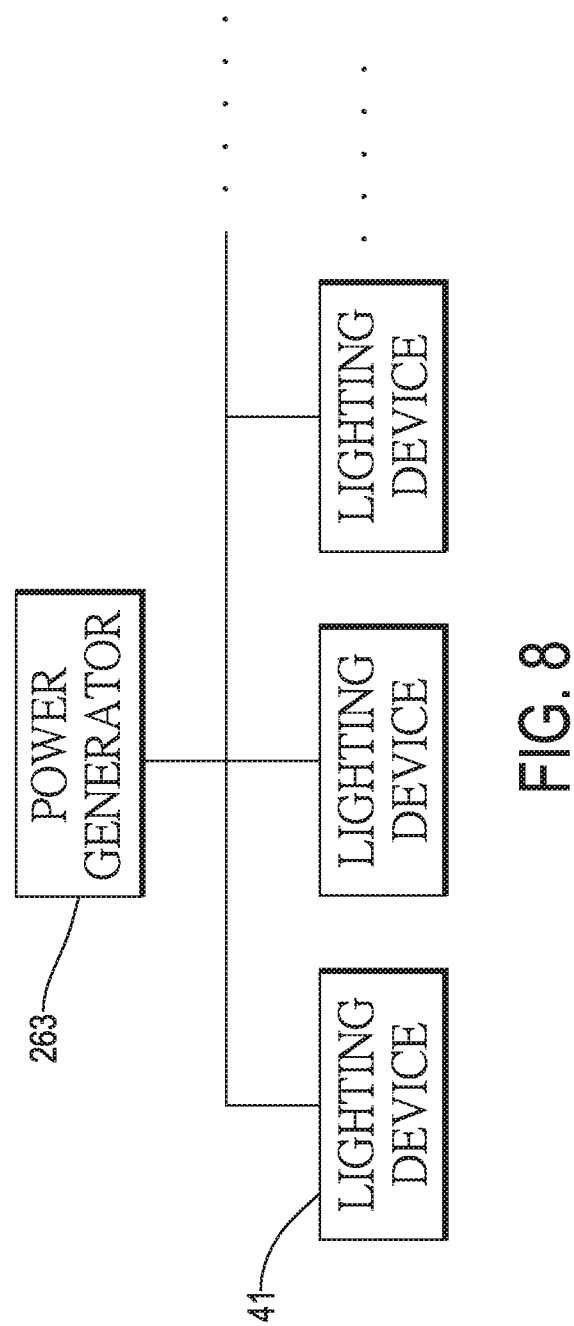
FIG. 8 is a circuit block diagram of the soil irrigation and restoration system in FIG. 7.

With reference to FIGS. 7 and 8, a third embodiment of a soil irrigation and restoration system in accordance with the present invention is substantially the same as the second embodiment, and the difference between the third embodiment and the second embodiment is that: the third embodiment of the soil irrigation and restoration system includes a canopy frame 40, and the canopy frame 40 has multiple lighting devices 41. Each one of the multiple lighting devices 41 is disposed on the canopy frame 40 and is located above one of the multiple basins 30. The water transmitting device 20 has a power generating device 26, and the power generating device 26 has a blade assembly 261, a transmission shaft 262, and a power generator 263. The blade assembly 261 is rotatably disposed in the water outlet 232 of the outlet tube of the water pumping element 23. The transmission shaft 262 has two ends. One of the two ends of the transmission shaft 262 is mounted to the blade assembly 261, and thus the transmission shaft 262 rotates along with the blade assembly 261. The other one of the two ends of the transmission shaft 262 is mounted to the power generator 263, and the power generator 263 is away from the blade assembly 261. When the water flows out of the water pumping element 23 via the water outlet 232, the water propels the blade assembly 261 to rotate. As the transmission shaft 262 rotates along with the blade assembly 261, the transmission shaft 262 propels the power generator 263 to generate electricity. With reference to FIG. 7, in addition, the power generator 263 is electrically connected to the multiple lighting devices 41. When the soil layer 10 in each one of the multiple basins 30 is utilized to cultivate crops, users can irrigate the soil layers 10 in the multiple basins 30 via the water transmitting device 20 to provide the crops with water. Moreover, since the power generating device 26 generates electricity as the water flows out of the water pumping element 23, the multiple lighting devices 41 provides stable light sources to facilitate growing of the crops.

According to syphon effect, the pressure difference between the water inlet 231 of the at least one inlet tube and the water outlet 232 of the outlet tube keeps the water in the water containing tank 21 flowing in the water pumping element 23 via the water inlet 231 of the at least one inlet tube, and then the water sequentially flows through the water outlet 232 of the outlet tube, the water storage tank 24, the pipe 25, and the soil layer 10. Besides, the height difference H between the connecting end 250 of the pipe 25 and the surface of the soil layer 10 provides the at least one injection hole 251 of the pipe 25 with the stable water pressure. The syphon effect and the height difference H keep the water flowing into the soil layer 10 and keep water pressure in the pipe 25 stable to prevent the sand and the soil in the soil layer 10 from blocking the pipe 25. On the other hand, transmitting the water with syphon effect can drastically decrease evaporated water, enhance utilization rate of the water, and restore dry and salinized soil. The soil irrigation and restoration method and system of the same do not need additional pressurization equipment, and thus possess the advantage of low cost. Moreover, when the present invention is utilized to cultivate the crops, the present invention not only irrigates the crops, but also generates electricity to provide the crops with stable light sources.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A soil irrigation and restoration method comprising steps as follows:
   a pipe laying step: laying a pipe in a soil layer, and the pipe irrigating the soil layer with water flowing therein;
   a water pumping element setting step: setting a water pumping element at a position higher than a surface of the soil layer, the water pumping element being located in and disposed at a lower portion of a containing space of a water containing tank and having
      at least one inlet tube extending upwardly and having a water inlet formed in a bottom of the at least one inlet tube and being adjacent to and spaced from a bottom of the containing space of the water containing tank,
      an outlet tube extending upwardly, spaced apart from the at least one inlet tube, and having a water outlet formed in a bottom of the outlet tube and connected to the pipe in the soil layer,
      an overflow portion formed on a top of the water pumping element, connected to and communicating with a top of the at least one inlet tube and a top of the outlet tube, and disposed at a position higher than a position of the water inlet of the at least one inlet tube and a position of the water outlet of the outlet tube, a relief valve disposed at the top of the water pumping element, and a drain valve disposed in the water outlet of the outlet tube; and a water pumping step: the water pumping element pumping water with syphon effect, such that water is pumped from the water pumping element downwardly to the soil layer via the pipe.

2. A soil irrigation and restoration system utilized on a soil layer having a surface and comprising:

a water transmitting device disposed at a position higher than the surface of the soil layer, and having a water containing tank having a containing space formed therein;

a water pumping element located in and disposed at a lower portion of the containing space of the water containing tank, being tubular in shape, and having at least one inlet tube extending upwardly and having a water inlet formed in a bottom of the at least one inlet tube and being adjacent to and spaced from a bottom of the containing space of the water containing tank;

an outlet tube extending upwardly, spaced apart from the at least one inlet tube, and having a water outlet formed in a bottom of the outlet tube;

an overflow portion formed on a top of the water pumping element, connected to and communicating with a top of the at least one inlet tube and a top of the outlet tube, and disposed at a position higher than a position of the water inlet of the at least one inlet tube and a position of the water outlet of the outlet tube;

a relief valve disposed at the top of the water pumping element; and a drain valve disposed in the water outlet of the outlet tube; and a pipe having a connecting end, connected to the water outlet of the outlet tube of the water pumping element via the connecting end, wherein a height difference is formed between the connecting end of the pipe and the surface of the soil layer and a portion of the pipe away from the connecting end extends downwardly and is buried in the soil layer.

3. The soil irrigation and restoration system as claimed in claim 2, wherein the soil irrigation and restoration system has multiple basins disposed at spaced intervals;

the soil layer is composed of soil contained in each one of the multiple basins; and the pipe of the water transmitting device connects the multiple basins, extends in each one of the multiple basins, and extends into the soil layer in each one of the multiple basins.

4. The soil irrigation and restoration system as claimed in claim 3, wherein the soil irrigation and restoration system has multiple lighting devices and each one of the multiple lighting devices is located above one of the multiple basins;

the water transmitting device has a power generating device having a blade assembly rotatably disposed in the water outlet of the outlet tube of the water pumping element;

a transmission shaft having two ends, and one of the two ends of the transmission shaft mounted to the blade assembly; and a power generator mounted to the other one of the two ends of the transmission shaft, and electrically connected to the multiple lighting devices.

5. The soil irrigation and restoration system as claimed in claim 2, wherein the water transmitting device has a water storage tank mounted to a bottom of the water containing tank and communicating with the water outlet of the outlet tube of the water pumping element; and the pipe is connected to the water storage tank via the connecting end.

6. The soil irrigation and restoration system as claimed in claim 3, wherein the water transmitting device has a water storage tank mounted to a bottom of the water containing tank and communicating with the water outlet of the outlet tube of the water pumping element; and the pipe is connected to the water storage tank via the connecting end.

7. The soil irrigation and restoration system as claimed in claim 4, wherein the water transmitting device has a water storage tank mounted to a bottom of the water containing tank and communicating with the water outlet of the outlet tube of the water pumping element; and the pipe is connected to the water storage tank via the connecting end.

8. The soil irrigation and restoration system as claimed in claim 2, wherein the water transmitting device has a sluice gate communicating with the containing space of the water containing tank and communicating with the water containing tank, and a ditch, such that water flowing in the ditch is guided to the water containing tank via the sluice gate.

9. The soil irrigation and restoration system as claimed in claim 3, wherein the water transmitting device has a sluice gate communicating with the containing space of the water containing tank and communicating with the water containing tank, and a ditch, such that water flowing in the ditch is guided to the water containing tank via the sluice gate.

10. The soil irrigation and restoration system as claimed in claim 4, wherein the water transmitting device has a sluice gate communicating with the containing space of the water containing tank and communicating with the water containing tank, and a ditch, such that water flowing in the ditch is guided to the water containing tank via the sluice gate.

11. The soil irrigation and restoration system as claimed in claim 2, wherein the water transmitting device has multiple supporting rods, and the water transmitting device is disposed vertically on the soil layer via the multiple supporting rods, wherein the height difference is formed between the connecting end of the pipe and the surface of the soil layer.

12. The soil irrigation and restoration system as claimed in claim 3, wherein the water transmitting device has multiple supporting rods, and the water transmitting device is disposed vertically on the soil layer via the multiple supporting rods, wherein the height difference is formed between the connecting end of the pipe and the surface of the soil layer.

13. The soil irrigation and restoration system as claimed in claim 4, wherein the water transmitting device has multiple supporting rods, and the water transmitting device is disposed vertically on the soil layer via the multiple supporting rods, wherein the height difference is formed between the connecting end of the pipe and the surface of the soil layer.

* * * * *